US012806717B2

(12) United States Patent
Hanschmann et al.

(10) Patent No.: US 12,806,717 B2
(45) Date of Patent: Nov. 24, 2026

(54) LASER PROCESSING OF WELD SEAMS

(71) Applicants: Florian Hanschmann, Perchtoldsdorf (AT); Steve Falter, Lake Orion, MI (US); Scott Uhl, Algonac, MI (US)

(72) Inventors: Florian Hanschmann, Perchtoldsdorf (AT); Steve Falter, Lake Orion, MI (US); Scott Uhl, Algonac, MI (US)

(73) Assignee: MAGNA INTERNATIONAL INC., Aurora (CA)

( * ) Notice: Subject to any disclaimer, the term of this patent is extended or adjusted under 35 U.S.C. 154(b) by 823 days.

(21) Appl. No.: 18/029,164

(22) PCT Filed: Oct. 2, 2021

(86) PCT No.: PCT/US2021/053272
§ 371 (c)(1),
(2) Date: Mar. 29, 2023

(87) PCT Pub. No.: WO2022/072909
PCT Pub. Date: Apr. 7, 2022

(65) Prior Publication Data

US 2023/0364713 A1 Nov. 16, 2023

Related U.S. Application Data

(60) Provisional application No. 63/086,615, filed on Oct. 2, 2020.

(51) Int. Cl.
*B23K 26/24* (2014.01)
*B08B 7/00* (2006.01)
*B23K 9/02* (2006.01)
*B23K 26/36* (2014.01)
*B23K 26/40* (2014.01)
*B23K 101/00* (2006.01)

(52) U.S. Cl.
CPC ............ *B23K 26/24* (2013.01); *B08B 7/0042* (2013.01); *B23K 9/02* (2013.01); *B23K 26/36* (2013.01); *B23K 26/40* (2013.01); *B23K 2101/006* (2018.08)

(58) Field of Classification Search
None
See application file for complete search history.

(56) References Cited

U.S. PATENT DOCUMENTS

2004/0065389 A1 4/2004 Kolberg et al.
2006/0035567 A1 * 2/2006 Helmig .................... B23K 9/32 451/75
2015/0251274 A1 9/2015 Hanschmann et al.
2015/0273629 A1 10/2015 Hanschmann et al.
2017/0361403 A1 12/2017 Gu et al.

* cited by examiner

*Primary Examiner* — John J Norton
(74) *Attorney, Agent, or Firm* — DICKINSON WRIGHT PLLC

(57) ABSTRACT

A method of making a part is provided. The method includes the step of welding at least two work pieces together to form a weld joint which contains at least one silicate island. The method proceeds with the step of laser cleaning the weld joint to remove at least a portion of the at least one silicate island from a top surface of the weld joint.

14 Claims, 4 Drawing Sheets

LASER PROCESSING OF WELD SEAMS

CROSS-REFERENCE TO RELATED APPLICATIONS

This U.S. National Stage Patent application claims the benefit of PCT International Patent Application Serial No. PCT/US2021/053272 filed Oct. 2, 2021 entitled "LASER PROCESSING OF WELD SEAMS" which claims the benefit of U.S. Provisional Patent Application Ser. No. 63/086,615 filed on Oct. 2, 2020, and titled "Laser Processing Of Weld Seams", the entire [disclosure] disclosures of which are hereby incorporated by reference.

BACKGROUND

1. Field

The present disclosure is related to welds between steel work pieces and, more particularly, to the processing of weld seams.

2. Related Art

Many metallic automotive parts (such as vehicle frames and cradles) are coated with an electrocoating (e-coating) to improve corrosion resistance. To improve a bond between the e-coating and the base metallic material, in many cases, a phosphate layer is first applied to the part such that the electrocoating is applied onto the phosphate layer. One known problem is that silicate islands, which often naturally form at the outer surfaces of weld joints, may inhibit the bonding of the phosphate layer to the base metal in the areas of the weld joints. Thus, without a cleaning operation to remove the silicate islands, the weld joints may become susceptible to corrosion sooner than the surrounding areas of the parts. A few known approaches to remove the silicate islands from weld joints to improve the bonds between those weld joints and the phosphate layer include chemical processes, mechanical abrasion, and shot blasting. However, these operations may come at a high cost and, in some cases, it may be very difficult for a worker to access certain weld joints.

There remains a significant and continuing need for an improved process to remove silicate islands from a weld joint at an increased speed and a reduced cost.

SUMMARY OF THE INVENTION

An aspect of the present disclosure is related to a method of making a part. The method includes the step of welding at least two work pieces together to form a weld joint which contains at least one silicate island. The method proceeds with the step of laser cleaning the weld joint to remove at least a portion of the at least one silicate island from a top surface of the weld joint.

According to another aspect of the present disclosure, the laser cleaning step does not remove material of the weld joint that surrounds the at least one silicate island.

According to yet another aspect of the present disclosure, the laser cleaning step involves directing a laser beam over an entire top surface including both the at least one silicate island and the material of the weld joint that surrounds the at least one silicate island.

According to still another aspect of the present disclosure, the method proceeds with the step of applying a phosphate layer onto the weld joint after the step of laser cleaning the weld joint.

According to a further aspect of the present disclosure, the method continues with the step of applying a coating onto the phosphate layer.

According to yet a further aspect of the present disclosure, the coating is an e-coating or a paint layer.

According to still a further aspect of the present disclosure, the step of laser cleaning the weld joint involves directing a pulsating laser beam from a laser head directly at the top surface of the weld joint.

According to another aspect of the present disclosure, the laser head is attached with the end of a robotic arm.

According to yet another aspect of the present disclosure, the laser has a power of 1-2 kW.

According to still another aspect of the present disclosure, the laser beam is moved along the top surface of the weld joint at speeds that could vary between 5 and 30 millimeters per second. In one presently preferred embodiment, the laser beam is moved at speeds of between 5 and 6 millimeters per second.

Another aspect of the present disclosure is related to a method of making a part. The method includes the step of preparing a part that includes at least one weld joint with at least one silicate island. The method proceeds with the step of directing a laser beam directly at a top surface of the at least one weld joint. The method continues with the step of removing, with the laser beam, at least a portion of the at least one silicate island with the laser beam while not removing material of the at least one weld joint that surrounds the at least one silicate island.

According to another aspect of the present disclosure, the laser beam is emitted from a laser head at the end of a robotic arm.

According to yet another aspect of the present disclosure, the laser beam has a power of 1-2 kW.

According to still another aspect of the present disclosure, the laser beam is moved along the top surface of the weld joint at a rate of 5-35 millimeters per second.

Yet another aspect of the present disclosure is related to a fabricated part that includes at least two pieces of metal joined together at a weld joint. The weld joint has been formed according to a welding process which includes the steps of welding the at least two work pieces together to form a weld joint which contains at least one silicate island and laser cleaning the weld joint to remove material from a top surface of the weld joint to reduce a size of the at least one silicate island.

According to another aspect of the present disclosure, a phosphate layer is disposed over the weld joint.

According to yet another aspect of the present disclosure, a coating is disposed over the phosphate layer.

According to still another aspect of the present disclosure, the forming process further includes directing a pulsating laser beam from a laser head directly at the top surface of the weld joint.

According to a further aspect of the present disclosure, the at least two pieces are made of steel or an alloy steel.

According to yet a further aspect of the present disclosure, during the laser cleaning step, material of the weld joint surrounding the at least one silicate island is not removed from the weld joint.

BRIEF DESCRIPTION OF THE DRAWINGS

These and other features and advantages of the present disclosure will be readily appreciated, as the same becomes better understood by reference to the following detailed description when considered in connection with the accompanying drawings wherein.

DETAILED DESCRIPTION OF THE ENABLING EMBODIMENT

Figure 1:
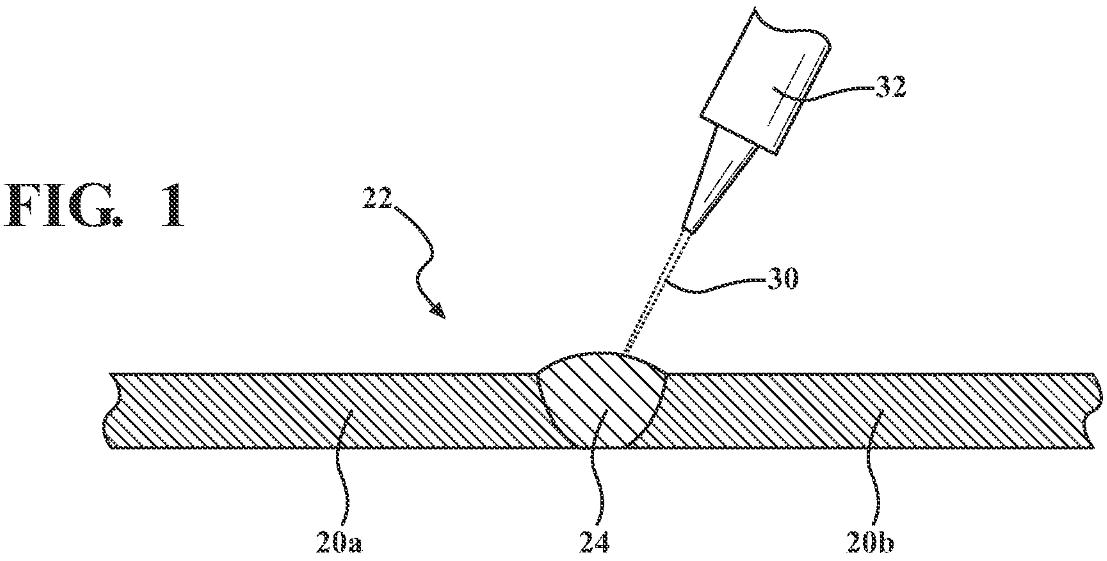
FIG. 1 is a cross-sectional view of two work pieces joined together at a weld joint to form a part and wherein the weld joint is undergoing a laser cleaning operation.

Referring to FIG. 1, an aspect of the present disclosure is related to process of welding two or more work pieces 20*a*, 20*b* together to form a part 22 (such as an automotive part) and then cleaning a resulting weld joint 24 to remove silicate islands 26 from the weld joint 24 prior to the application of a phosphate coating 28 onto the part 22 using a laser cleaning operation.

Figure 4:
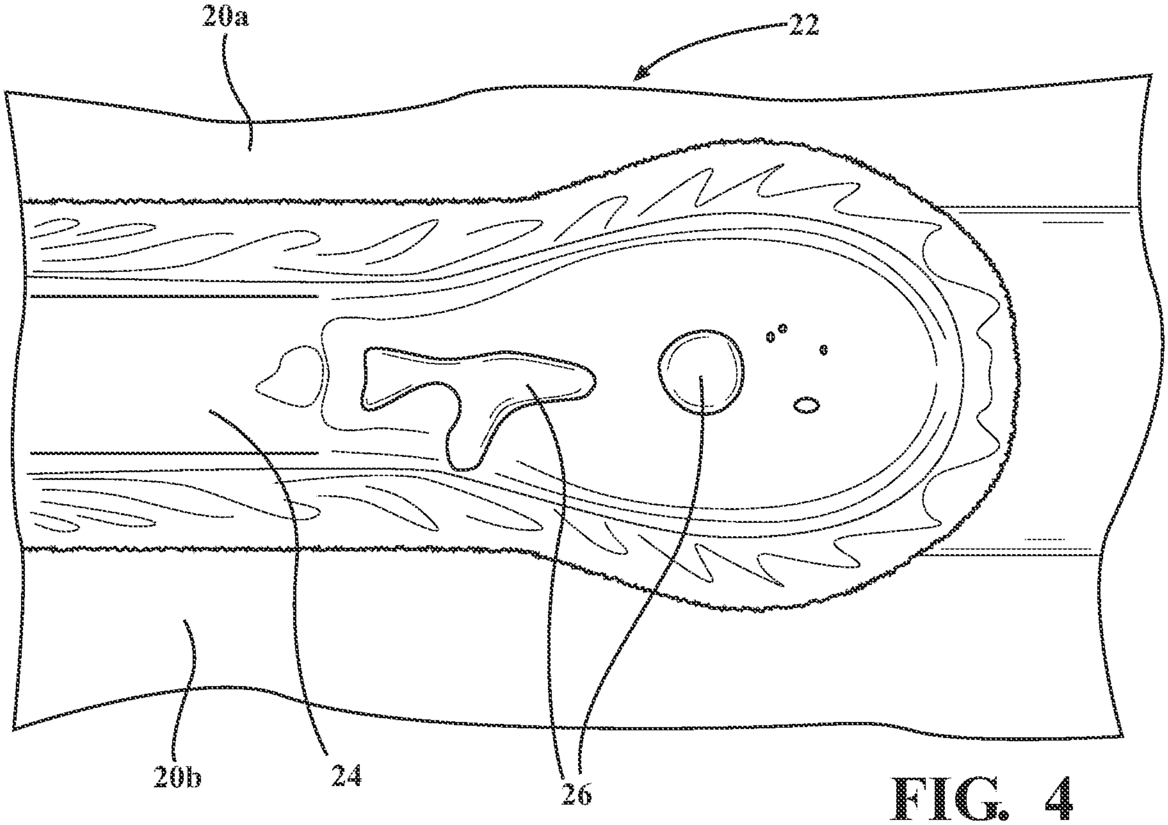
FIG. 4 is a cross-sectional view of a weld joint prior to the laser cleaning operation.

The process begins with the steps of arranging the work pieces 20*a*, 20*b* in a joint and welding the workpieces together at the joint to form the weld joint 24. In the exemplary embodiment, the welding operation is a MIG welding operation; however, other known welding operations (such as laser welding) may be employed. As shown in FIG. 4, in many instances, the weld joint 24 formed by the welding operation will include one or more silicate islands 26. As discussed in further detail below, during finishing operation, some of the material of the weld joint 24 is removed from the weld joint 24 to remove the silicate islands 26 through a laser ablation process.

Referring back to FIG. 1, in the exemplary embodiment, the work pieces 20*a*, 20*b* are welded together in a butt joint. The work pieces 20*a*, 20*b* may be spaced apart from one another by approximately 0.4 mm prior to the welding operation. In some embodiments, the work pieces 20*a*, 20*b* may be joined together in any suitable type of welding joint 24 including, for example, an edge joint, a corner joint, a T-joint, a lap joint, etc. The work pieces 20*a*, 20*b* are made of steel or other metals. In the exemplary embodiment, the work pieces 20*a*, 20*b* form an automotive part, such as a vehicle frame or a cradle and may have any suitable thicknesses. In the exemplary embodiment, the work pieces 20*a*, 20*b* are parts of a vehicle frame, such as for a light duty truck. However, the work pieces 20*a*, 20*b* can find uses in other vehicle components or in other industries. It should be appreciated that the use of the term "steel" herein is meant to include alloy steels.

Figure 5:
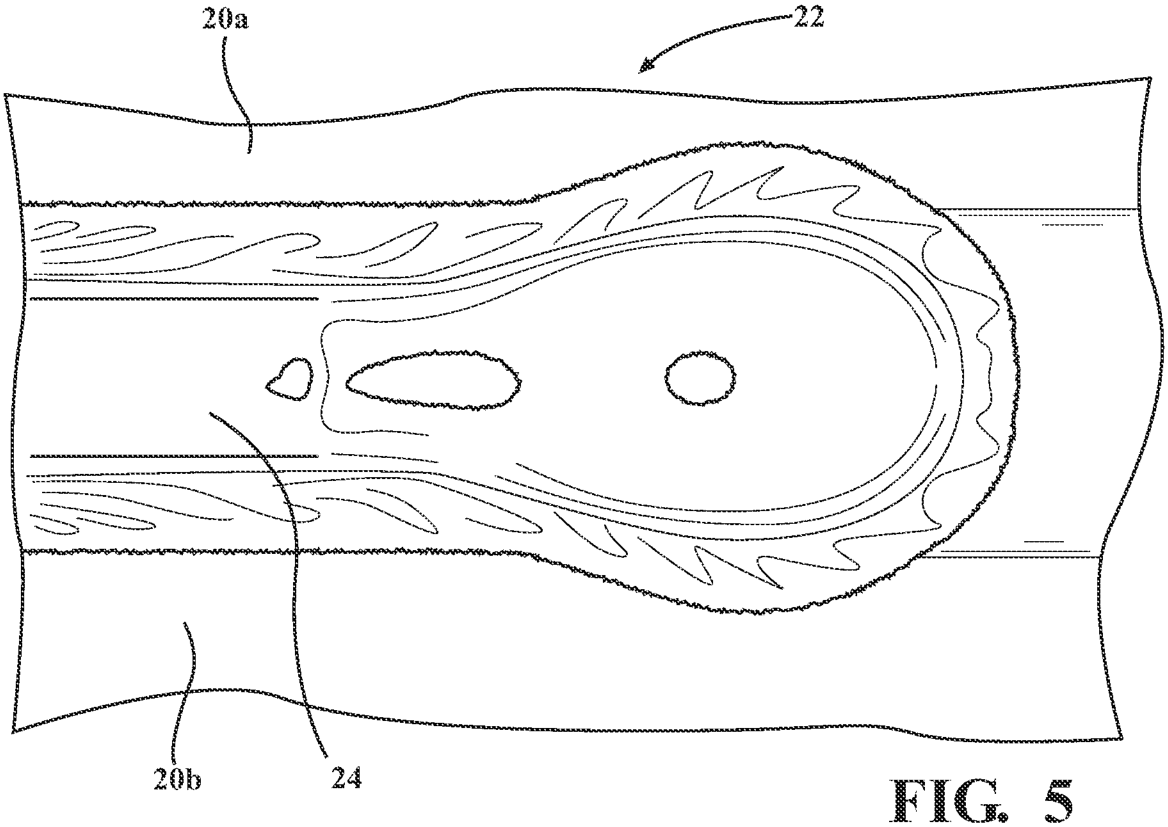
FIG. 5 shows a laser cleaning mechanism.

To free the weld joint 24 of the silicate islands 26, the laser cleaning operation includes emitting a laser beam 30 from a laser head 32 (sometimes known as a 2D scanner) directly at a top (outer) surface of the weld joint 24 to remove material from the top layer of the weld joint 24 through an ablation process. Specifically, the laser beam 30 is pulsed at a specific frequency and with a predetermined power and at a predetermined wavelength such that all or most of the material of the silicate islands 26 along with any dust and oxides is sublimated without any removal of the material of the weld joint 24 that surrounds the silicate islands 26. This process has been found to allow silicate islands of up to 0.1 mm in diameter to be completely or substantially entirely removed from a weld joint 24. An exemplary weld joint 24 which has been cleaned to remove and/or reduce the size of the silicate islands 26 is shown in FIG. 5. In one example, a laser beam with a power of 1-2 kW and travelling along the weld seam at a speed of 5-35 mm/second has been found to be particularly effective at removing silicate islands 26 with minimal (if any) damage to the surrounding portions of the weld joint 24.

Figure 6:
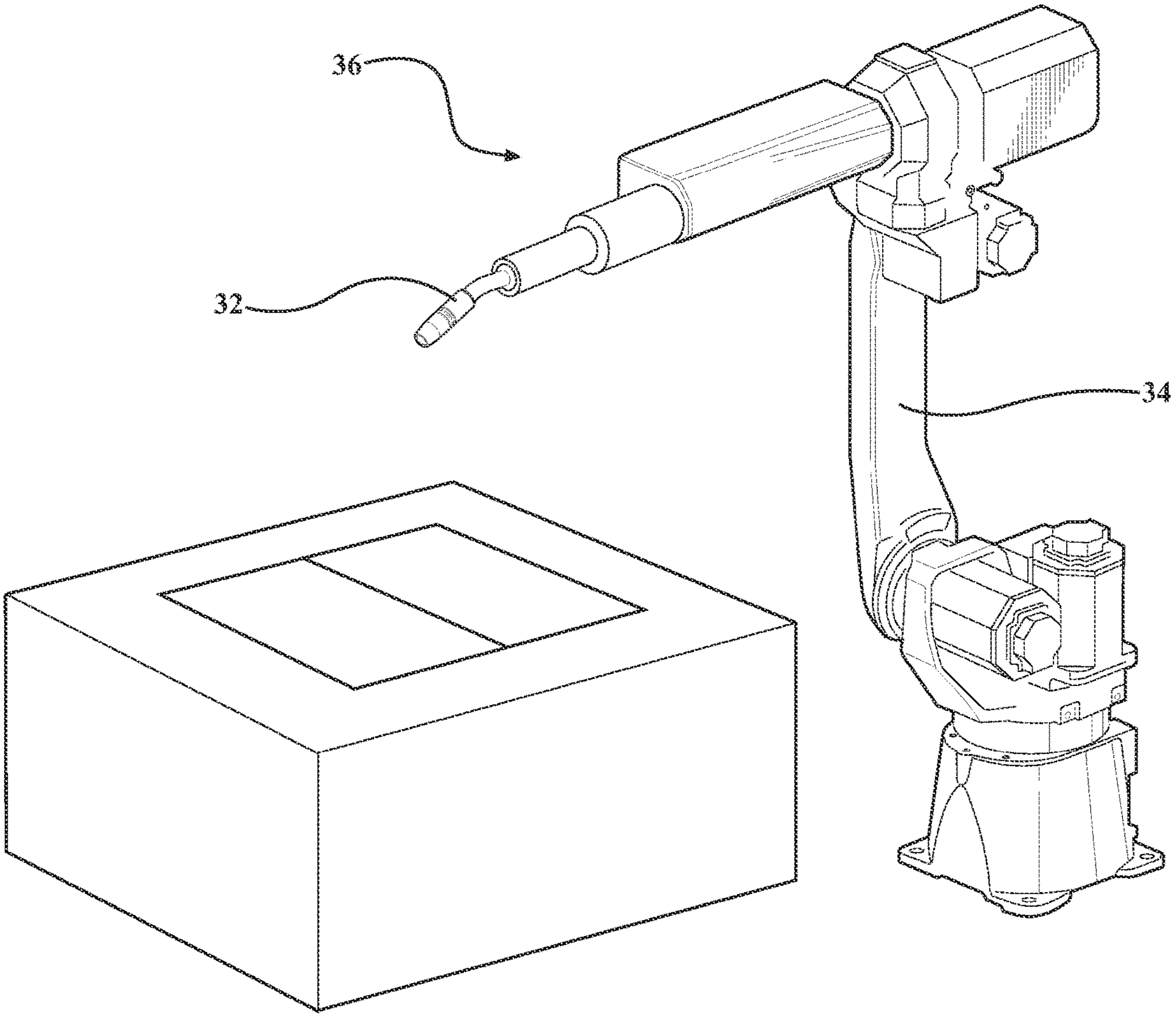
FIG. 6 is a cross-sectional view of a weld joint after the laser cleaning operation.

Referring now to FIG. 6. the laser head 32 preferably includes a wobble head which automatically controls the emission of the laser beam 30 to control the ablation process. The laser head 32 is mounted at the end of a six-axis robotic arm 34 that can maneuver the laser head 32 around the work pieces 20*a*, 20*b* to clean weld joints 24 that might be difficult to reach using conventional cleaning techniques. During operation, the laser beam 30 sweeps over the entire weld joint 24 including both the silicate islands 26 and the material of the weld joint 24 that surrounds the silicate islands 26.

Figure 8:
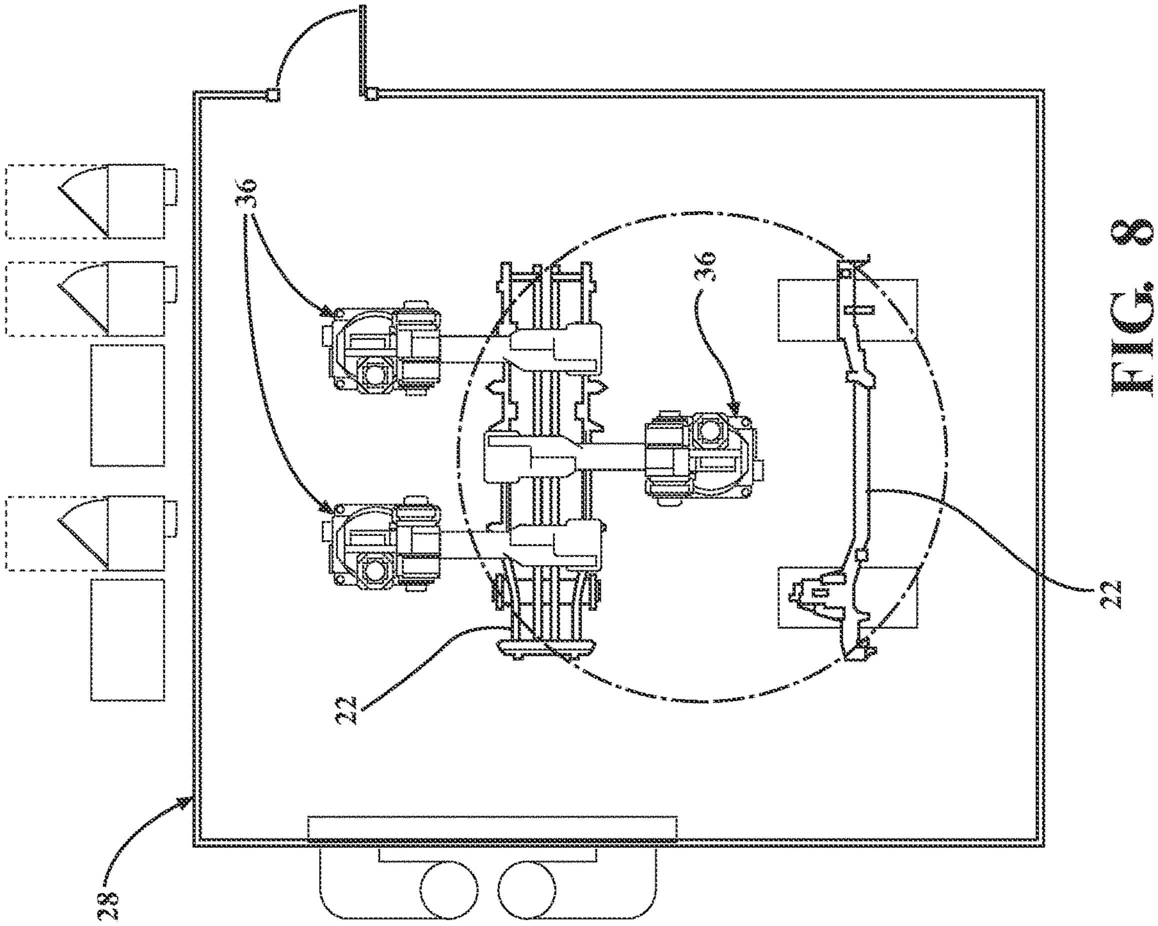
FIG. 8 is a schematic view showing another workspace that can perform the laser cleaning operation.
Figure 7:
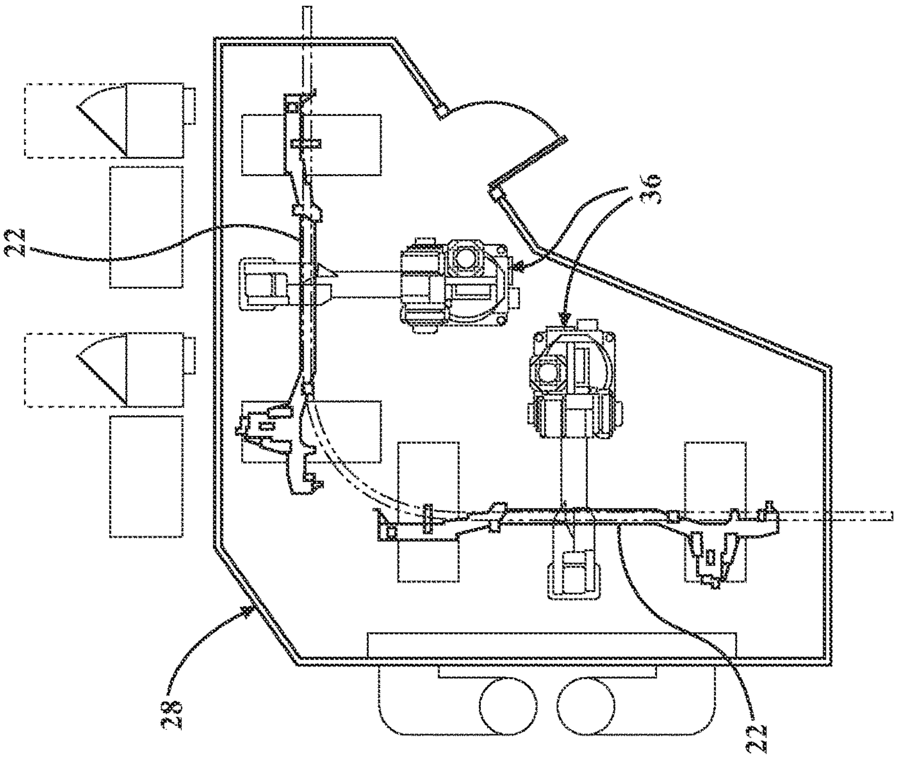
FIG. 7 is a schematic view showing a workspace that can perform the laser cleaning operation.

Another aspect of the present disclosure is related to a manufacturing assembly line which includes a laser ablation station that is configured to remove silicate islands from pre-formed weld joints prior to the application of a phosphate coating. In the exemplary embodiments shown in FIGS. 7 and 8, a pair of laser cleaning assemblies 36 (each including a robotic arm 34 and a laser head 32) are disposed in a well ventilated and filtered cleaning workspace 38 that is a part of an automobile assembly line. In operation, a part 22 to be cleaned (such as a vehicle frame or a part of a vehicle frame) enters the cleaning workspace 38 on a track and is brought to one or both of the laser cleaning assemblies 36. Controllers direct the laser heads 32 and robotic arms 34 through pre-programmed operations to clean the full outer surfaces of a plurality of weld joints 24 on the parts 22. The laser cleaning assemblies 36 may operate simultaneously clean up all or only some of the weld joints 24 on one part 22 or the laser cleaning assemblies 36 can operate on different parts 22. In other embodiments, the workspace 38 may only include a single laser cleaning assembly 36 or it may include three or more laser cleaning assemblies 36. In the embodiment of FIG. 7, the weld joints 24 are cleaned prior to joining two halves of a vehicle frame together, whereas in the embodiment of FIG. 8, the weld joints 24 are cleaned after assembly of the frame is completed.

In some embodiments, the laser cleaning assemblies 36 may be configured to clean the weld joints 24 on different types of parts 22 which have different weld numbers or locations, e.g., vehicle frames with differing lengths. To accomplish this, the controllers of the laser cleaning assemblies 36 are configured to detect or otherwise determine which type of part 22 enters the workspace 38. Each type of part 22 may be associated with a unique operating procedure, which may include robotic arm movements, laser beam power, laser beam wavelength, and laser beam pulse frequency. Thus, when a part 22 of a first type enters the workspace 38, the laser cleaning assemblies 36 will operate according to respective first operating procedures and when a part 22 of a second type enters the workspace 38, the laser cleaning assemblies 36 will operate according to respective second operating procedures. Thus, the laser cleaning assemblies 36 can be used to clean weld joints 24 on an assembly line which produces different products.

The laser cleaning operation has been found to be faster, less costly, and more reliable than other known finishing operations which remove silicate islands. No manual brushing (mechanical abrasion), shot cleaning, or chemical processes are required to remove the silicate islands 26 from the weld joint 24.

Figure 2:
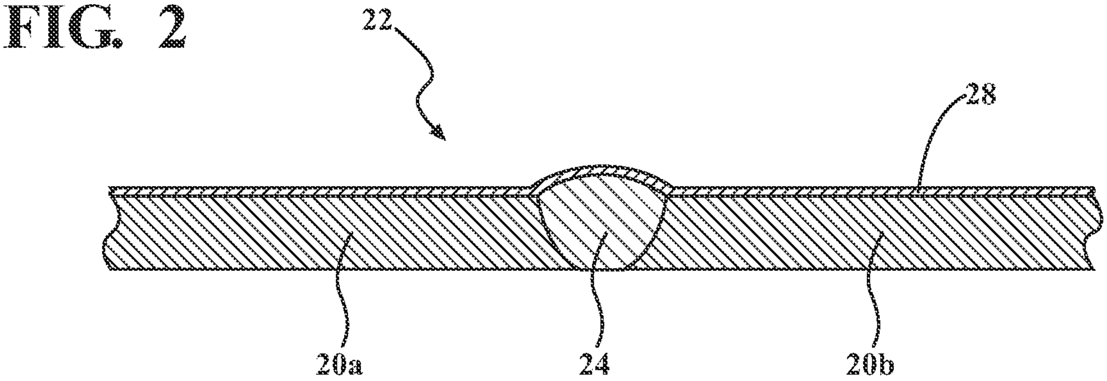
FIG. 2 shows the part and with a phosphate coating being applied to an outer surface of the part.
Figure 3:
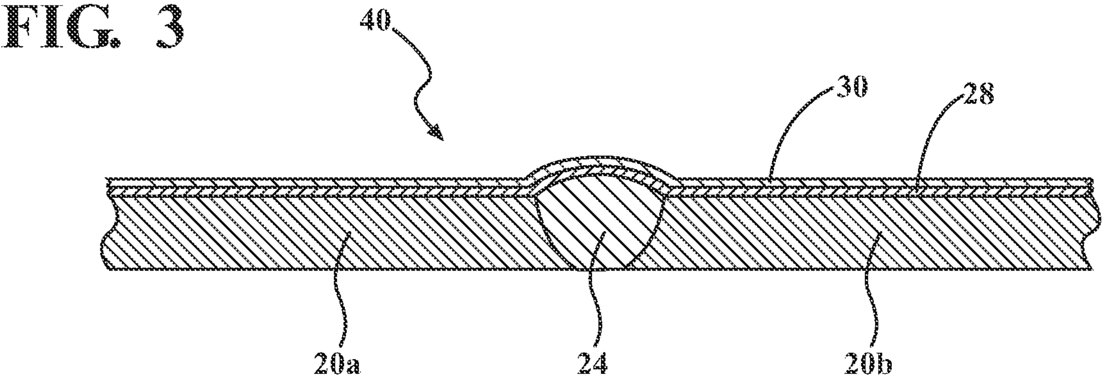
FIG. 3 shows the part and with an additional layer being applied onto the phosphate coating.

Referring now to FIG. 2, once the finishing operation is completed, the method proceeds with the step of applying a phosphate coating 28 onto the part 22, including over the entire weld joint 24. Because of the laser cleaning operation, the weld joint 24 is free of silicate islands 26 or the silicate islands 26 are very small in size so as to have minimal effect on the strength of the bond between the part 22 and the phosphate coating 28. Therefore, the bond between the phosphate coating 28 and the metallic material of the weld joint 24 is very strong in comparison to parts where the weld joints are not cleaned of silicate islands. As shown in FIG. 3, an additional layer 40, such as an e-coating layer or a paint layer, is then applied on top of the phosphate layer 28. Depending on the application of the part 22, other types of coatings may also be applied onto the phosphate coating 28.

Obviously, many modifications and variations of the present invention are possible in light of the above teachings and may be practiced otherwise than as specifically described while within the scope of the appended claims.

What is claimed is:

1. A method of making a part, comprising the steps of:
welding at least two work pieces together to form a weld joint which contains at least one silicate island; and
laser cleaning the weld joint to sublimate at least a portion of the at least one silicate island from a top surface of the weld joint.

2. The method of making a part as set forth in claim 1 wherein the laser cleaning step does not remove material of the weld joint that surrounds the at least one silicate island.

3. The method of making a part as set forth in claim 2 wherein the laser cleaning step involves directing a laser beam over an entire top surface of the weld joint including both the at least one silicate island and the material of the weld joint that surrounds the at least one silicate island.

4. The method as set forth in claim 1 further including a step of applying a phosphate layer onto the weld joint after the step of laser cleaning the weld joint.

5. The method as set forth in claim 4 further including a step of applying a coating onto the phosphate layer.

6. The method as set forth in claim 5 wherein the coating is an e-coating or a paint layer.

7. The method as set forth in claim 1 wherein the step of laser cleaning the weld joint involves directing a pulsating laser beam from a laser head directly at the top surface of the weld joint.

8. The method as set forth in claim 7 wherein the laser head is attached with the end of a robotic arm.

9. The method as set forth in claim 8 wherein the laser beam has a power of 1-2 kW.

10. The method as set forth in claim 9 wherein the laser beam is moved along the top surface of the weld joint at a rate of 5-35 millimeters per second.

11. A method of making a part, comprising the steps of:
preparing a part that includes at least one weld joint that includes at least one silicate island;
directing a laser beam directly at a top surface of the at least one weld joint; and
sublimating with the laser beam at least a portion of the at least one silicate island with the laser beam while not removing material of the at least one weld joint that surrounds the at least one silicate island.

12. The method as set forth in claim 11 wherein the laser beam is emitted from a laser head at the end of a robotic arm.

13. The method as set forth in claim 11 wherein the laser beam has a power of 1-2 kW.

14. The method as set forth in claim 13 wherein the laser beam is moved along the top surface of the weld joint at a rate of 5-35 millimeters per second.

* * * * *